(12) United States Patent
Söderberg

(10) Patent No.: US 7,044,998 B2
(45) Date of Patent: May 16, 2006

(54) METHOD AND APPARATUS FOR SEPARATION OF STEAM AND GAS FROM POSSIBLY GLUE-COATED FIBRE PULP PRODUCED BY A REFINER

(75) Inventor: Carl-Johan Söderberg, Sundsvall (SE)

(73) Assignee: Metso Paper, Inc., (FI)

( * ) Notice: Subject to any disclaimer, the term of this patent is extended or adjusted under 35 U.S.C. 154(b) by 241 days.

(21) Appl. No.: 10/398,199

(22) PCT Filed: Sep. 25, 2001

(86) PCT No.: PCT/SE01/02059

§ 371 (c)(1),
(2), (4) Date: Jul. 29, 2004

(87) PCT Pub. No.: WO02/29342

PCT Pub. Date: Apr. 11, 2002

(65) Prior Publication Data

US 2004/0261619 A1 Dec. 30, 2004

(30) Foreign Application Priority Data

Oct. 6, 2000 (SE) .................................. 0003621

(51) Int. Cl.
  B01D 45/12 (2006.01)
  F26B 3/08 (2006.01)
  F26B 7/00 (2006.01)
(52) U.S. Cl. ...................... 95/271; 55/459.1; 55/467.1; 34/369; 34/371; 34/381
(58) Field of Classification Search ............... 95/271
  See application file for complete search history.

(56) References Cited

U.S. PATENT DOCUMENTS 3,354,555 A * 11/1967 Barr .............................. 34/586
6,158,145 A * 12/2000 Landon et al. ................. 34/364

FOREIGN PATENT DOCUMENTS

DE 3003971 A1 8/1980
WO WO-97/25575 A1 7/1997

* cited by examiner

Primary Examiner—Robert A. Hopkins
(74) Attorney, Agent, or Firm—Lerner, David, Littenberg, Krumholz & Mentlik, LLP

(57) ABSTRACT

When separating steam and gas from a stream containing, possibly glue-coated, fibre pulp produced by a refiner, the hot fibre pulp is directly fed from the refiner to a separation cyclone (4) placed in a drying channel (2) for drying the fibre pulp. A hot drying air flow having substantially higher temperature, about 160° C., than the fibre pulp is blown through the drying channel so that the separation cyclone is surrounded by the hot drying air flow. The light steam containing fraction separated by the separation cyclone is conducted out of the separation cyclone via an outlet conduit (9) away from the hot drying air flow, whereas the separated heavy fibre containing fraction is conducted out of the separation cyclone directly into the hot drying air flow that entrains the heady fraction to a drying plant. Energy is recovered from the light steam containing fraction and ecologically harmful substances are separated from the latter.

8 Claims, 1 Drawing Sheet

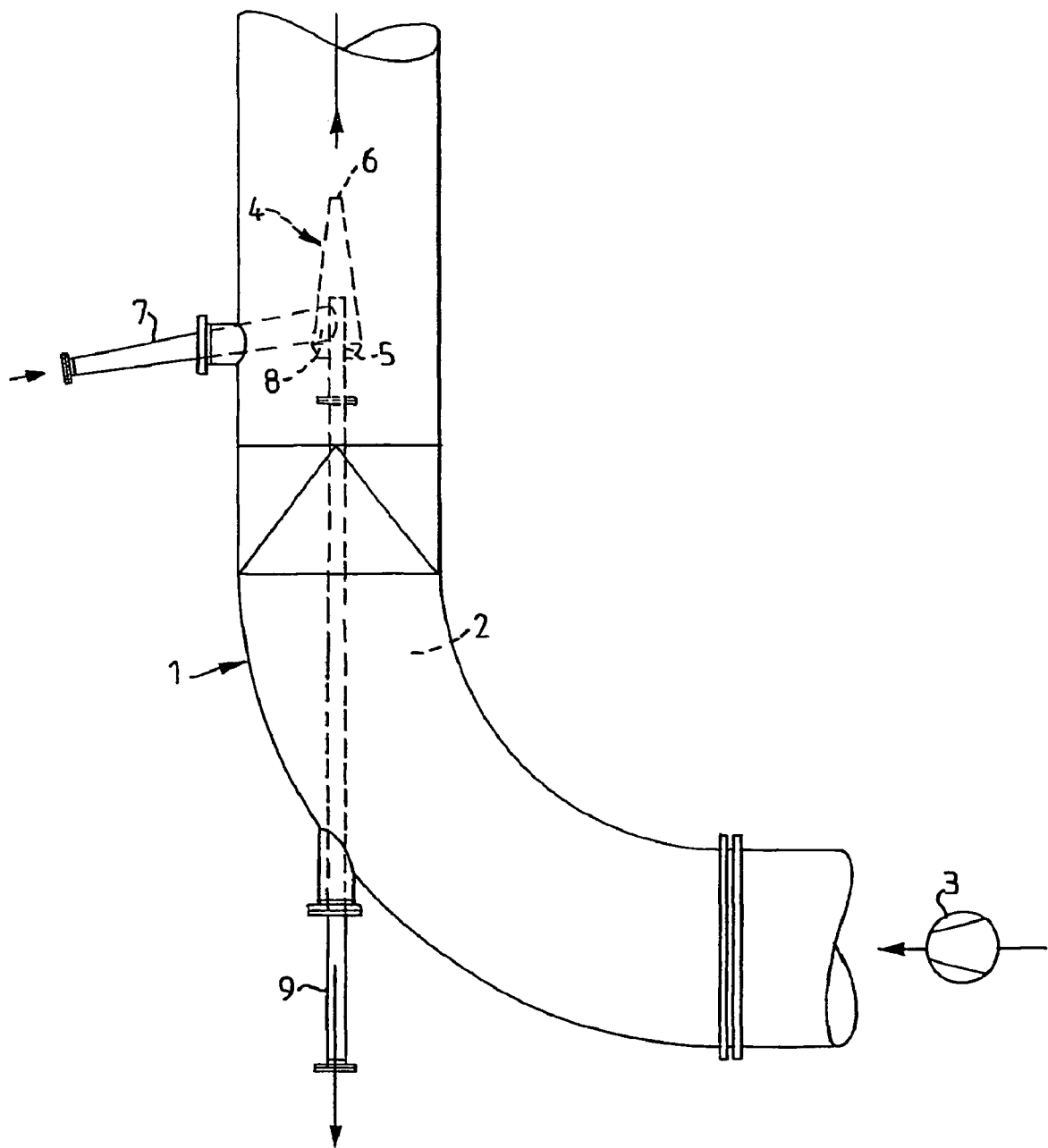

METHOD AND APPARATUS FOR SEPARATION OF STEAM AND GAS FROM POSSIBLY GLUE-COATED FIBRE PULP PRODUCED BY A REFINER

The present invention relates to a method of separating steam and gas from a steam containing, possibly glue-coated, fibre pulp produced by a refiner. The invention also relates to an apparatus for separating steam from such a fibre pulp comprising a gas conduit forming a drying channel, a fan device for generating a hot drying air flow through the drying channel, and an inlet-conduit for supplying a hot fibre flow from the refiner to the drying channel.

When thermally treating and defibration of wood chips or similar lignocellulose material, substances in the form of highly concentrated formaldehyde and organic compounds of high concentration are released leaving the refiner together with steam and the moist fibre pulp produced. Traditionally, the fibre pulp is conducted from the refiner via a pipeline at high speed to a pulp-drying plant, in which the fibre pulp is dried in one or more stages by means of large drying cyclones. In the drying cyclones very large volumes of drying air together with steam and moist from the fibre pulp are separated and conducted out into the atmosphere. Thus, also the released gaseous wood substances of high concentration escape to the atmosphere, which is ecologically harmful.

The object of the present invention is to provide a new method and a new apparatus for separating steam from a steam containing, possibly glue-coated, fibre pulp produced by a refiner, which enables special treatment, such as condensation or destruction by incineration, of the gases released from the wood substances before these gases are mixed with drying air and enter the atmosphere.

This object is obtained by the new method characterised in that a conical separation cyclone is placed in a drying channel for drying the fibre pulp, the produced hot fibre pulp is directly fed from the refiner to the separation cyclone that separates the fibre pulp into a heavy fraction containing fibres and a light fraction containing steam, a hot drying air flow having substantially higher temperature than the fibre pulp entering the separation cyclone is blown through the drying channel so that the separation cyclone is surrounded by the hot drying air flow, the light fraction containing gas and steam is conducted out from the separation cyclone via an outlet conduit away from the hot drying air flow, and the heavy fibre fraction is conducted out from the separation cyclone directly into the hot drying air flow that entrains the fibre fraction.

By placing the separation cyclone in the drying channel that has a significantly higher temperature than the fibre pulp conducted into the separation cyclone, the advantage is obtained that requirements are created for forming a steam film on the inner wall of the separation cyclone. Such a steam film counteracts the deposit of moist fibres on the inner wall and clogging of the relatively small separation cyclone. Otherwise the risk of clogging normally should be significant, because the apex outlet for the fibre pulp at the conical separation cyclone is relatively small, the diameter of the apex outlet being about 100 to 150 mm.

Gaseous wood substances released from the process, such as formaldehyde and other volatile organic wood substances together with steam will be separated in the separation cyclone into a relatively small fraction with respect to volume and as a result can be taken care of and destructed in a cost efficient manner. Energy is advantageously recovered from the light fraction containing hot steam.

The object of the invention is also obtained by an apparatus of the kind initially described characterised in that the inlet conduit is connected to a conical separation cyclone arranged in the drying channel, the separation cyclone being adapted to separate the fibre pulp into a heavy fraction containing fibres and a light fraction containing steam, that an outlet conduit for the light fraction containing steam extends from the separation cyclone out of the drying channel, that an apex outlet in the separation cyclone for the heavy fibre containing fraction opens into the drying channel, and that the fan device is adapted to generate the hot drying air flow with a temperature substantially higher than the temperature of the fibre pulp supplied to the drying channel via the inlet conduit.

The conical separation cyclone preferably is oriented in the drying channel with the apex outlet leading, as seen in the direction of the hot drying air flow. Furthermore, the fan device is suitably adapted to generate the hot drying air flow with a temperature of 120° C.–170° C.

The invention is described in more detail in the following with reference to the accompanying drawing, which shows an embodiment of the apparatus according the invention.

The drawing shows an apparatus for separating steam from a steam containing, possibly glue-coated, fibre pulp produced by a refiner (not shown). The apparatus comprises a gas conduit 1 forming a drying channel 2, and a fan device 3 adapted to generate a hot drying air flow through the drying channel 2. The drying channel 2 constitute part of a drying plant (not completely shown).

A conical separation cyclone 4 with a base outlet 5 and a apex outlet 6 is centrally arranged in the drying channel 2. The separation cyclone 4 is oriented in the drying channel 2 with the apex outlet leading as seen in the direction of the hot drying air flow in the drying channel 2. An inlet conduit 7 for fibre pulp, to which the refiner is attended to be connected, extends through the wall of the gas conduit 1 into the drying channel 2 and is there connected to a tangential inlet 8 in the separation cyclone 4. An outlet conduit 9 extends from the base outlet 5 of the cyclone separator 4 out through the wall of the gas conduit 1.

During operation of the apparatus according to the invention the fan device 3 blows hot drying air of about 160° C. through the drying channel 2. Hot fibre pulp having substantially lower temperature, about 100° C., than the drying air flow through the drying channel 2 is conducted from the refiner via the inlet conduit 7 into the separation cyclone 4. In this the fibre pulp is separated into a heavy fibre containing fraction that passes through the apex outlet 6 out into the drying channel where the heavy fraction is entrained by the drying air flow to the drying plant, and a light steam containing fraction that passes through the base outlet 5 to the outlet conduit 9. Energy can be recovered from the obtained light fraction and be utilised for among other things preheating of the drying air. Besides, ecologically harmful gaseous substances in a form of formaldehyde and organic compounds released from wood and glue can be reduced as well, when condensating the steam in the light fraction.

The invention claimed is:

1. A method of separating steam and gas from a steam containing, possibly glue-coated, fiber pulp produced by a refiner, the method comprising:

placing a conical separation cyclone in a drying channel for drying the fiber pulp, directly feeding the produced hot fiber pulp from the refiner to the separation cyclone, separating the fiber pulp by the cyclone into a heavy fraction containing fibers and a light fraction containing steam and gas, blowing a hot drying air flow of substantially higher temperature than the fiber pulp entering the separation cyclone through the drying channel so that the separation cyclone is surrounded by the hot drying air flow, conducting the light steam and gas containing fraction out of the separation cyclone via an outlet conduit away from the hot drying air flow, and conducting the heavy fiber fraction out of the separation cyclone directly into the hot drying air flow, whereby the hot drying air flow entrains the heavy fiber fraction.

2. A method according to claim 1 further comprising orienting the separation cyclone in the drying channel so that the drying air flow flows in the direction from the base toward the apex of the conical separation cyclone.

3. A method according to claim 1, wherein the drying air flow has a temperature in the range of 120° C.–170° C.

4. A method according to claim 1 further comprising recovering energy from the light steam and gas containing fraction.

5. A method according to claim 1 further comprising destructing ecologically harmful substances in the light steam and gas containing fraction.

6. An apparatus for separating steam and gas from a steam containing hot fiber pulp produced by a refiner, comprising:

a gas conduit forming a drying channel, a fan device for generating a hot drying air flow through said drying channel, an inlet conduit for supplying hot fiber pulp from the refiner to said drying channel, said fan device being adapted to generate said hot drying air flow with a temperature substantially higher than the temperature of the fiber pulp supplied to said drying channel via said inlet conduit, a conical separation cyclone arranged in said drying channel and connected to said inlet conduit, said separation cyclone being adapted to separate the fiber pulp into a heavy fraction containing fibers and a light fraction containing steam and gas, an outlet conduit for said light steam and gas containing fraction extending from said separation cyclone out of said drying channel, and an apex outlet in said separation cyclone for said heavy fiber containing fraction opening into said drying channel.

7. An apparatus according to claim 6, wherein said conical separation cyclone is oriented in said drying channel with said apex outlet leading, as seen in the direction of said hot drying air flow.

8. An apparatus according to claim 6, wherein said fan device is adapted to generate said hot drying air flow with a temperature in the range of 120° C.–170° C.

* * * * *

UNITED STATES PATENT AND TRADEMARK OFFICE
CERTIFICATE OF CORRECTION

| | |
|---|---|
| PATENT NO. | : 7,044,998 B2 |
| APPLICATION NO. | : 10/398199 |
| DATED | : May 16, 2006 |
| INVENTOR(S) | : Carl-Johan Söderberg |

Page 1 of 1

It is certified that error appears in the above-identified patent and that said Letters Patent is hereby corrected as shown below:

On the face of the patent, (86), delete "July 29, 2004" and insert therefor --September 29, 2003--
          Column 1, line 13, delete "-".

Signed and Sealed this

Nineteenth Day of September, 2006

JON W. DUDAS
*Director of the United States Patent and Trademark Office*